(12) United States Patent
Huang et al.

(10) Patent No.: US 7,781,064 B2
(45) Date of Patent: Aug. 24, 2010

(54) SUBSTRATE COATED WITH A COATING

(75) Inventors: Yuan-Chang Huang, Keelung (TW);
Leng-Long Jou, Taipei County (TW);
Yuung-Ching Sheen, Hsinchu County (TW); Yih-Her Chang, Hsinchu (TW);
Chia-Lin Wen, Miaoli County (TW);
Hsiao-Hua Wu, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 11/976,850

(22) Filed: Oct. 29, 2007

(65) Prior Publication Data

US 2008/0063797 A1  Mar. 13, 2008

Related U.S. Application Data

(63) Continuation-in-part of application No. 11/318,459, filed on Dec. 28, 2005.

(30) Foreign Application Priority Data

Nov. 16, 2006  (TW) .............................. 95142416 A

(51) Int. Cl.
*B05D 3/02*  (2006.01)
(52) U.S. Cl. ..................... 428/425.5; 427/180; 427/384; 427/397.7

(58) Field of Classification Search ....................... None
See application file for complete search history.

(56) References Cited

U.S. PATENT DOCUMENTS

| 6,335,037 | B1 * | 1/2002 | Ichinohe et al. ............. 424/490 |
| 6,455,103 | B1 * | 9/2002 | Mennig et al. .............. 427/165 |
| 6,743,467 | B1 | 6/2004 | Jones et al. | |
| 2006/0029808 | A1 * | 2/2006 | Zhai et al. .................... 428/412 |
| 2007/0141114 | A1 * | 6/2007 | Muisener et al. ............ 424/427 |

FOREIGN PATENT DOCUMENTS

| EP | 0 772 514 B1 | | 12/1998 |
| EP | 1479738 | * | 11/2004 |
| WO | WO 94/09074 | * | 4/1994 |
| WO | WO-03/008697 A3 | | 1/2003 |

* cited by examiner

*Primary Examiner*—Erma Cameron
(74) *Attorney, Agent, or Firm*—Birch, Stewart, Kolasch & Birch, LLP

(57) ABSTRACT

A low stain and low mist adhesion coating. Micro- or nano-particles are treated with a hydrophobic agent and an additive to form larger microstructure with the hydrophobic agent and the additive bonded thereto forming a low stain and low mist adhesion coating material. A low stain and low mist adhesion coating formed from the material has a contact angle of at least 130°. In addition, the low stain and low mist adhesion coating has less than 60% mist adhesion area.

19 Claims, No Drawings

SUBSTRATE COATED WITH A COATING

CROSS REFERENCE TO RELATED APPLICATIONS

This application is a Continuation-In-Part of pending U.S. patent application Ser. No. 11/318,459, filed Dec. 28, 2005 and entitled "Method for forming coating material and the material formed thereby".

BACKGROUND OF THE INVENTION

1. Field of the Invention

The invention relates to coating technology, and in particular to a waterproof, high contact angle, low stain and low mist adhesion coating.

2. Description of the Related Art

European Publication Number EP0772514 issued to Bartholtt in 1995, discloses hydrophobic self-cleaning material, and created a microstructured hydrophobic material. PCT Publication Number WO03008697 issued to Creavis Tech & Innovation GmbH in 2003, discloses other self-cleaning material and the hydrophobicity of the material was increased. However, both the disclosed surface microstructures exhibit poor resistance to external force, and the self-cleaning efficacy declines rapidly with time. U.S. Pat. No. 6,743,467 issued to Unisearch Limited in 2004, discloses using inorganic siloxane as precursors of crosslinker and gel, and then chemically modified to obtain a super hydrophobic material, but because the crosslinker is inorganic siloxane, a high reaction temperature is required to reach the desirable hydrophobicity.

The wettability of solid surfaces is determined by both the chemical composition and geometrical microstructure of the surface. Currently, hydrophobic surfaces with water contact angle higher than 130° are arousing much interest because they will bring great convenience in daily life as well as in many industrial processes. Various phenomena, such as contamination or oxidation, are expected to be inhibited on such a surface.

An important application of hydrophobic surface is self-cleaning coating by repelling water and dirt because of super low surface energy surface. These self-cleaning coatings not only provide value-added products with a high potential to save on cleaning and other maintenance costs, but also are good for the ecobalance of the coated product, since cleaning chemicals no longer pollute the water and energy is saved by reducing or eliminating maintenance cycles.

Conventionally, hydrophobic surfaces have been produced mainly in two ways. One is to create a rough structure on a hydrophobic surface, and the other is to modify a surface by materials with low surface free energy. Unfortunately, both approaches have several issues to deal with. Most hydrophobic coatings with surface roughness do not exhibit sufficient mechanical strength and adhesion, which results in short lifetimes. Others modified with low surface energy materials generally do not exhibit sufficient hydrophobicity (contact angle with water<130°) or adhesion.

BRIEF SUMMARY OF THE INVENTION

The invention provides a low stain and low mist adhesion coating formed by a process comprising the steps of: (a) providing micro or nano-particles; (b) treating the particles with a hydrophobic agent and an additive to form a coating material comprising a larger microstructure with the hydrophobic agent and the additive bonded thereto; (c) applying the coating material on a substrate and then drying or curing the coating material to form a coating having a microstructured, hydrophobic surface, wherein the hydrophobic surface has a water contact angle of at least 130° and a mist adhesion area of less than 60%.

The process mentioned above, between the step (b) and step (c) further comprise attaching a binder or crosslinker to the larger microstructure by reaction with an additive, hydrophobic agent, or particles.

A detailed description is given in the following embodiments.

BRIEF DESCRIPTION OF THE DRAWINGS none

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

A self-cleaning coating with improved physical properties as well as sufficient surface hydrophobicity is obtained by chemical modification of particle surfaces using an additive, a hydrophobic agent, and a binder or crosslinker. In the preferred embodiment of the invention, a super high contact angle and high weatherability coating material can be reached, which can be applied at room temperature. Other objects and advantages of the invention will become apparent from the following description.

In the invention, micro-particles varying from about 0.1 µm to 100 µm or nano-particles varying from about 1 nm to 100 nm may be used as starting materials for forming the coating material. Preferably, particles having a diameter of about 1-1000 nm are used. These particles are preferably particles prepared from wet synthesis process. Any known wet synthesis processes such as sol gel, hydrothermal, or precipitation process may be used. For example, the precursor can include water, solvent, and metal alkoxide. Examples of the metal alkoxide include tetramethoxysilane (TMOS), tetraethoxysilane (TEOS), titanium tetraisopropoxide, titanium tetramethoxide, titanium tetraethoxide, titanium tetrabutoxide and zirconium n-butoxide. The solvent may comprise an alcohol such as methanol, ethanol, isopropanol, or butanol. Other solvents, however, such as hexane, toluene, ketone or diethyl ether, may be used. The sol gel precursors may be refluxed for an extended period, such as a period of above 5 minutes, preferably from 0.5 to 24 hours to yield the desired sol gel particles. For example, silicate gels may be prepared by hydrolyzing an alkoxide dissolved in an alcohol with a mineral acid or base, or organic acid or base.

It is to be understood that many types or grades of commercially available silica particles and colloidal silica may be used for the invention. Those skilled in the art will also recognize that although silica particles are preferred, any particles with —SiR, —TiR, —ZrR or —AlR groups, wherein R is OH, COOH, COOR', $NH_2$, $CONH_2$, NCO, SH, vinyl, or epoxy for proceeding condensation reactions may be used for the invention, and wherein R' is $C_1$-$C_5$ alkyl.

In accordance with the invention, a hydrophobic agent and a functional additive are employed to chemically modify the aforementioned particles. The surfaces of the particles are modified by the hydrophobic agent to enhance the chemical hydrophobicity. The additive makes particles grow into larger entities to physically increase hydrophobicity by providing surface roughness, the reason maybe promotes hydrolysis and condensation reactions of the particles Further, as an important feature of the invention, the additive also functions as a coupling agent, which forms bonding with the particles on one side, and on the other side, forms bonding with a binder or crosslinker. As such, the additive attaches the binder or crosslinker to the particles. For example, a coupling agent having a functional group may be used to modify the surface of wet synthesized or commercially available particles. The coupling agent is a compound having siloxane or functional group preferably, wherein the functional group may comprise OH, COOH, COOR, $NH_2$, $CONH_2$, NCO, SH, vinyl, or epoxy having reactive ability, wherein R is $C_1$-$C_5$ alkyl such as $CH_3$ or $CH_2CH_3$.

Hydrophobic agents conventionally used in the art may be used herein for enhancing the chemical hydrophobicity of the particle surface. Frequently used hydrophobic agents include Si-based hydrophobic agents such as siloxane, silane, or silicone; F-based hydrophobic agents such as fluorosilanes, fluoroalkyl silanes (FAS), polytetrafluoroethylene (PTFE), polytrifluoroethylene, polyvinylfluoride, or functional fluoroalkyl compounds; and carbohydrate or hydrocarbon hydrophobic agents such as reactive wax, polyethylene, or polypropylene. A particularly preferred hydrophobic agent is polydimethylsiloxane (PDMS), a polymer with hydroxyl groups terminating the ends of each chain.

The additives used in the invention include those capable of promoting particle growth, having functional groups to react with both of the particles and a binder or crosslinker to function as a coupling agent that increases compatibility between particles and resins. Examples of such additives include alkoxysilanes having functional groups of vinyl, amino, epoxy, carboxyl, hydroxyl, or isocyanate. Illustrative examples include amino trialkoxysilane, vinyl trialkoxysilane, or epoxy trialkoxysilane.

The steps of treating the particles with the hydrophobic agent and the additive may take place ex-situ in an arbitrary order, or in-situ and simultaneously in one container. For example, after forming a sol gel from sol gel precursors, the hydrophobic agent and the additive can be directly mixed and reacted at a temperature between 0 and 100° C. for minutes or hours, preferably 1-48 hours. The pH value of the reaction is preferably controlled at about 6.5-14, more preferably about 9-13 for the aggregation to proceed. As a result, a particle aggregate with the hydrophobic agent and the additive bonded on the surface thereof can be obtained.

As another important feature of the invention, the particles bond a binder or crosslinker by any high energy bond, such as chemical bond. This can be accomplished by forming chemical bonds with the additive on the particle surfaces. Alternatively, the binder or crosslinker may be attached to the particles by forming strong bonding with the hydrophobic agent on the particle or directly with the particles. The binder or crosslinker strong bonded to the particle may increase the mechanical properties of the coatings, including adhesion and mechanical strength, without deteriorating the hydrophobicity. Suitable organic binders or crosslinkers used herein may include those conventionally used in the art and having reactive functional groups such as vinyl, amino, epoxy, carboxyl, hydroxyl, or isocyanate. Preferred examples include epoxy resins, polyureathanes, polyesters, acrylic resins, polyamides, and silicone resins.

The reaction of the binder or crosslinker may be carried out immediately following the additive treatment. For example, when the additive treatment is completed, the binder or crosslinker is added to the reaction mixture and reacted at a temperature between 0-200° C. for 1 minute to 48 hours.

It will be appreciated that the order of these reactions may be reversed. For example, the method of the invention may also be carried out by adding the hydrophobic agent and the binder (or crosslinker) followed by adding the additive.

The larger particles formed by the invention typically have sizes varying from about 200 nm to about 1000 μm. Preferably, the coating material may be prepared by reactions of 1-40 wt % of the particles, 0.1-20 wt % of the hydrophobic agent, 0.1-15 wt % of the additive, 0-11.2 wt % of organic binder or crosslinker, and residual amounts of solvent, based on the total weight of the coating material.

The coating material may be applied to a substrate by any known technique of forming a coating from a liquid, such as spin coating, dip coating, spray coating, brush coating, or roller coating. The coating may be dried or cured at a temperature between −20° C. and 200° C. over a period of 1 minute to 48 hours. Note that the drying temperature and time may vary depending on the type of particles, melting point of the substrate, curing condition of used chemicals, and thickness of the coating.

As an important feature of the invention, coatings of the invention generally have a water contact angle of at least 130°. In preferred embodiments, the hydrophobic coatings may exhibit a water contact angle of at least 150° or even 160°, and therefore can be used to be low stain and low mist adhesion coatings.

As other feature of the invention, coatings of the invention generally have a mist adhesion area of less than 60%. In preferred embodiments, the hydrophobic coatings may exhibit a mist adhesion area of less than 30% or even less than 1%, and therefore the coatings of the invention have excellent low mist adhesion function. Moreover, after outside atmosphere exposure for 3 months, a lightness difference (ΔL) of the coating is less than 3 or a color difference (ΔE) of the coating is less than 3, or even a lightness difference (ΔL) is less than 1 or a color difference (ΔE) is less than 1, and a water contact angle of the coating decreases less than 1%. Since the coatings generally exhibit improved adhesion and mechanical strength, they are particularly suitable for producing self-cleaning facade paints to increase the lifetime of facades.

Surfaces which can be treated with the hydrophobic coating include wafer, glass, plastics, metal, ceramic, wood, polymer or a combination thereof, but can also include other materials or composites. The coatings of the invention also can be applied on the surfaces of a building, conveyance or satellite communication equipment. Furthermore, the coating of the invention can be used as a special coating to inhibit contamination, mist adhesion, corrosion, or icing.

EXAMPLE

Example 1

4 g of TEOS, 1.5 g of 2-amino-2-methyl-1-propanol (AMP-95), 20 g of ethanol, and 1.1 g of water were mixed and reacted at room temperature for 30 minutes. Thereafter, 0.8 g of PDMS, 0.4 g of 3-glycidoxypropyl trimethoxysilane (Z6040, Dow Corning) and 0.32 g of KOH (0.1 mol/l) were added to the reaction mixture and reacted at room temperature for 48 hours with the pH value controlled at about 10-13. Following this, 0.2 g of epoxy resin (ERL 4221, Union Carbide) were added and reacted at room temperature for 48 hours. The resulting aggregate material was applied to a calcium silicate plate with a facade paint thereon by dip coating, and dried.

Comparative Example 1

4 g of commercial silica particles (1630S, Chang Chun PetroChemical; 30 wt % of the solid; size: 16 nm), 1.5 g of 2-amino-2-methyl-1-propanol (AMP-95), 21 g of ethanol, and 1.1 g of water were mixed and reacted at room temperature for 30 minutes. Thereafter, 0.75 g of PDMS and 0.75 g of APS were added to the reaction mixture and reacted at room temperature for 4 days with the pH value controlled at about 10-13. Following this, 0.2 g of epoxy resin (ERL 4221, Union Carbide) were added and reacted at room temperature for 48 hours. The resulting aggregate material was applied to a calcium silicate board with a facade paint thereon by dip coating, and dried.

Mist Adhesion Test

The calcium silicate plates (15×7 cm$^2$) applied with different coatings were provided to face the south at an angle of 45° to carry the test out and the results are shown in Table 1.

TABLE 1

Mist adhesion test

| Sample | | Original water contact angle | Accumulated rainfall 2.7 mm | Accumulated rainfall 137.6 mm |
|---|---|---|---|---|
| Example 1 | The invention | >160° | ◎ | ◎ |
| Comparative Example 1 | General high contact angle coating material | 144° | Δ | X |
| Comparative Example 2 | ICI/Dulux Pentalite Plus A986 | 90° | X | X |
| Comparative Example 3 | Ching Yeh/Cement Mortar Paint | 82° | X | X |
| Comparative Example 4 | Yung Chi Paint/410 Rainbow Emulsion Paint | 80° | X | X |

◎: The mist adhesion area of the coating was less than 1%, and the coating maintain super hydrophobicity.;
Δ: The mist adhesion area of the coating was between 30% and 60%,;
X: The hydrophobicity of the coating disappeared.

The mist adhesion area of the coating of the invention was less than 1% at the accumulated rainfall 2.7 mm and 137.6 mm. However, in all comparative examples, only the mist adhesion area of Comparative Example 1 was between 30% and 60% at the accumulated rainfall 2.7 mm, and the hydrophobicity of other comparative examples disappeared at the accumulated rainfall 2.7 mm and 137.6 mm. Therefore, the coating of the invention showed excellent low mist adhesion feature.

Sun Exposure and Contamination Test

The calcium silicate plates (15×7 cm$^2$) applied with different coatings were provided to face the south at an angle of 45° to expose under the outside atmosphere for 3 months to carry the test out and the results are shown in Table 2.

TABLE 2 outside atmosphere exposure and contamination test

| Sample | | Lightness difference (ΔL) | Color difference (ΔE) | Original water contact angle | Water contact angle (after 3 months) |
|---|---|---|---|---|---|
| Example 1 | The invention | 0.5 | 0.73 | 161° | 160° |
| Comparative Example 1 | General high contact angle coating material | 10.31 | 10.54 | 144° | 147° |
| Comparative Example 2 | ICI/Dulux Pentalite Plus A986 | 7.93 | 7.96 | 90° | 50° |
| Comparative Example 3 | Ching Yeh/Cement Mortar Paint | 6.14 | 7.18 | 82° | 50° |
| Comparative Example 4 | Yung Chi Paint/410 Rainbow Emulsion Paint | 5.67 | 6.78 | 80° | 78° |

The lightness difference (ΔL) and color difference (ΔE) of the coating of the invention were both less than 1 after outside atmosphere exposure for 3 months, but the lightness difference (ΔL) and color difference (ΔE) of other comparative examples were all greater than 5. Especially the lightness difference (ΔL) and color difference (ΔE) of Comparative Example 1 were both greater than 10. Furthermore, after sun exposure for 3 months, water contact angle of the coating of the invention decreases to less than 1%. Therefore, the coatings of the invention showed excellent anti-contamination ability and high weatherability.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A substrate coated with a coating formed by a process comprising the steps of:
   (a) providing micro or nano-particles prepared from a wet synthesis;
   (b) treating the particles with a hydrophobic agent and an additive ex-situ in an arbitrary order or in-situ and simultaneously in one container to form a coating material comprising a microstructure with the hydrophobic agent and the additive bonded thereto, wherein the particles are treated with the additive at a pH of about 9-13 and the additive promotes aggregation of the particles prepared from the wet synthesis to increase hydrophobicity by providing surface roughness;

(c) applying the coating material on a substrate and then curing the coating material to form a substrate coated with a coating having a microstructured, hydrophobic surface, wherein the hydrophobic surface has a water contact angle of at least 130°.

2. The substrate as claimed in claim 1, between the step (b) and step (c) further comprising attaching a binder or crosslinker to the microstructure by reaction with the additive, the hydrophobic agent, or the particles.

3. The substrate as claimed in claim 1, wherein the micro- or nano-particles contain groups selected from the group consisting of —SiR, —TiR, —ZrR and —AlR groups, wherein R is OH, COOH, COOR', NH2, CONH2, NCO, SH, vinyl, or epoxy, wherein R' is C1-C5 alkyl.

4. The substrate as claimed in claim 2, wherein the additive comprises a functional group capable of bonding with the binder or crosslinker.

5. The substrate as claimed in claim 4, wherein the functional group is selected from the group consisting of vinyl, amino, epoxy, carboxyl, hydroxyl, and isocyanate.

6. The substrate as claimed in claim 5, wherein the additive comprises functional alkoxysilane.

7. The substrate as claimed in claim 1, wherein the hydrophobic agent comprises Si-based materials.

8. The coating as claimed in claim 1, wherein the hydrophobic agent comprises F-based materials, carbohydrate materials or hydrocarbon materials.

9. The substrate as claimed in claim 2, wherein the binder or crosslinker contains a functional group selected from the group consisting of vinyl, amino, epoxy, carboxyl, hydroxyl, and isocyanate.

10. The substrate as claimed in claim 2, wherein the binder or crosslinker is selected from the group consisting of epoxy resins, polyurethanes, polyesters, acrylic resins, polyamides, and silicone resins.

11. The substrate as claimed in claim 1, wherein the coating material is applied to the substrate using spin coating, dip coating, spray coating, brush coating, or roller coating.

12. The substrate as claimed in claim 1, wherein the water contact angle is at least 150°.

13. The substrate as claimed in claim 1, wherein the water contact angle is at least 160°.

14. The substrate as claimed in claim 1, wherein a lightness difference ($\Delta L$) of the coating is less than 3 or a color difference ($\Delta E$) of the coating is less than 3 after outside atmosphere exposure for 3 months.

15. The substrate as claimed in claim 1, wherein a lightness difference ($\Delta L$) of the coating is less than 1 or a color difference ($\Delta E$) of the coating is less than 1 after outside atmosphere exposure for 3 months.

16. The substrate as claimed in claim 1, wherein the substrate is selected from the group consisting of wafer, glass, plastics, metal, ceramic, wood, polymer and a combination thereof.

17. The substrate as claimed in claim 16, wherein the coating is applied on a building.

18. The substrate as claimed in claim 16, wherein the coating is applied on a conveyance.

19. The substrate as claimed in claim 16, wherein the coating is applied on satellite communication equipment.

* * * * *